(12) United States Patent
Van Do et al.

(10) Patent No.: US 7,664,676 B2
(45) Date of Patent: Feb. 16, 2010

(54) ROAMING FOR MOBILE E-COMMERCE

(75) Inventors: Thanh Van Do, Oslo (NO); Cathal Kennedy, Baerums Verk (NO); Savas Omurcali, Upplands Väsby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 946 days.

(21) Appl. No.: 10/467,038

(22) PCT Filed: Dec. 7, 2001

(86) PCT No.: PCT/SE01/02719

§ 371 (c)(1),
(2), (4) Date: Nov. 20, 2003

(87) PCT Pub. No.: WO02/063528

PCT Pub. Date: Aug. 15, 2002

(65) Prior Publication Data

US 2004/0068446 A1    Apr. 8, 2004

(30) Foreign Application Priority Data

Feb. 8, 2001    (NO) .................................. 20010667

(51) Int. Cl.
*G06Q 30/00*    (2006.01)

(52) U.S. Cl. .......................................... 705/26; 705/27
(58) Field of Classification Search .................. 705/26, 705/27
See application file for complete search history.

(56) References Cited

U.S. PATENT DOCUMENTS

| 6,237,096 B1 * | 5/2001 | Bisbee et al. ............... 713/178 |
| 7,107,248 B1 * | 9/2006 | Asokan et al. ............... 705/67 |
| 2002/0052754 A1 * | 5/2002 | Joyce et al. ..................... 705/1 |

OTHER PUBLICATIONS

Raffray, Nathalie; "Who will get the credit?" Communications International, Oct. 2000, pp. 64-68; Dialog file 15 #02093241.*

* cited by examiner

*Primary Examiner*—Robert M. Pond

(57) ABSTRACT

A method is disclosed by which a user of a roaming mobile station can procure services and goods from a content provider at a visiting site. The content provider establishes contact with a mobile e-commerce server, the visited MeC server. The visited MeC server directs the request to the users home MeC server. The home MeC server performs the authentication of the user. In this way security relevant information is not revealed to the visited MeC server.

21 Claims, 6 Drawing Sheets

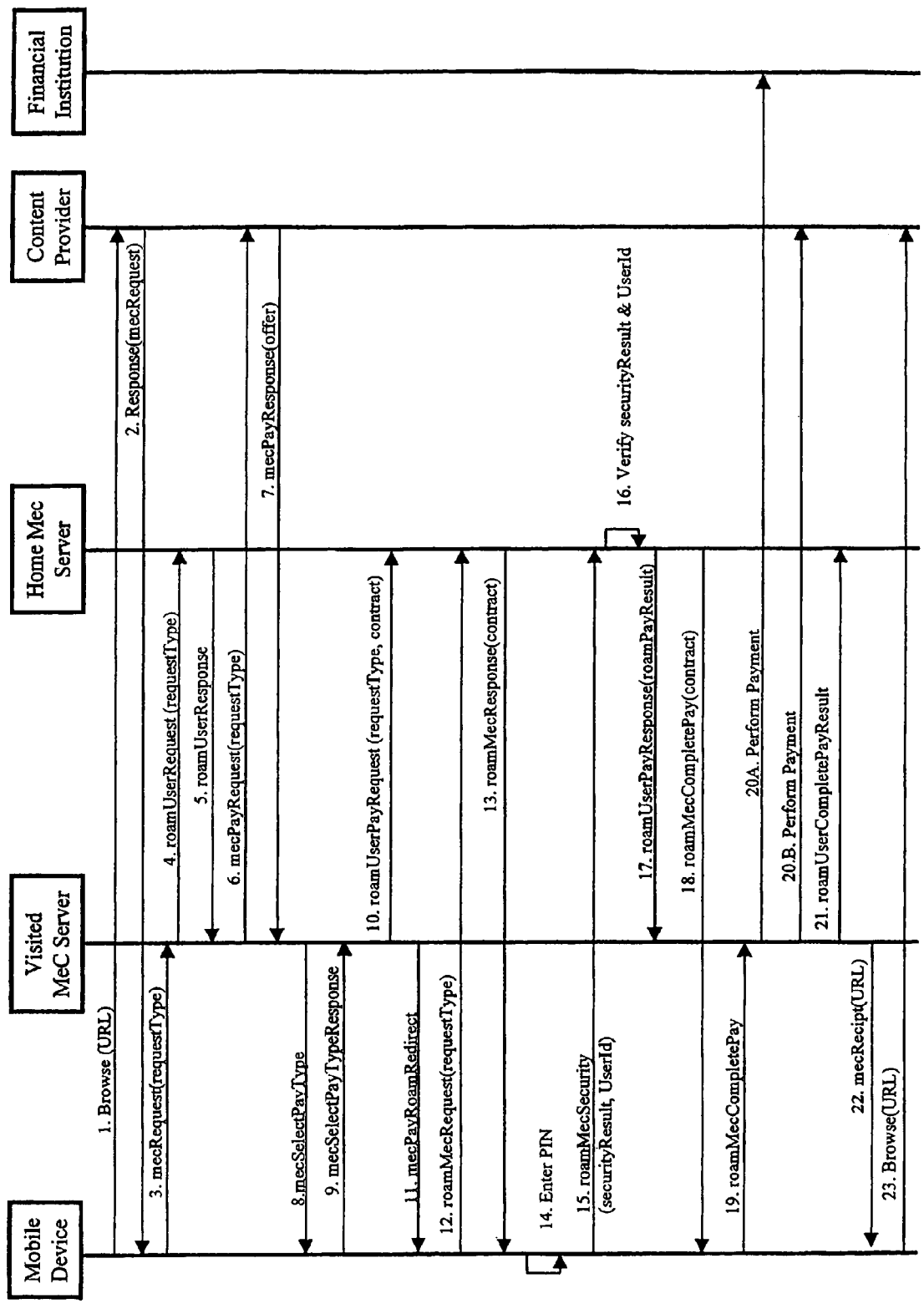
Figur 6

ROAMING FOR MOBILE E-COMMERCE

TECHNICAL FIELD

This invention is applicable for Mobile e-Commerce.

TECHNICAL BACKGROUND

Mobile e-Commerce

Mobile e-Commerce is commerce made available to the mobile user through mobile devices such as mobile phones, PDA, etc. The mobile user has the possibility to make a bet, play a game, pay bills, perform a transaction, buy stocks, buy and pay securely using their mobile device.

Due to the physical limitations of the mobile devices such as processing power, memory size, battery lifetime, etc. it is common to have a Mobile e-Commerce (MeC) server to assist in the security and payment processes. FIG. 1 shows an example of a Mobile e-Commerce system, which consists of:
  Mobile devices
  A Mobile e-Commerce Server
  Financial Institutions
  Merchant or Content Provider In general a user browses to a merchant or content provider site using their mobile device. They are presented with options and select goods or services to be purchased. At some stage they will wish to "check out" and pay for these selected items. The content provider diverts the request to the MeC Server. The MeC server maintains relevant user information in order to authenticate, and get payment approval. It then contacts the Financial Institution (e.g. Credit Card Company, bank, etc.) to get payment clearance.

On a positive answer from the Financial Institution, the MeC server will inform the content provider to proceed. Depending on the nature of the merchandise, it could be delivered directly to the user, be picked up by the user or be shipped by post later. The general flow is shown in FIG. 2.

It is important to note that in this scenario, both the user and the content provider are registered in the Mobile e-Commerce server. Obviously the Financial Institution has agreements with the Mobile e-Commerce service provider and the content provider for payment clearance. This environment can be regarded as the Home Service Area. How the user access this service area, is outside the scope of this document.

Related Prior Art

International patent application WO9944165 discloses a system for e-Commerce on the Internet, enabling customers to pay for services and goods from prepaid accounts. The system is based on the use of modular transaction servers (TxS). The TxS includes among other an input device for receiving requests for a service from end-users, a service device rendering the requested service and an account device for keeping track of the users balances.

In a roaming situation, two TxS devices are involved. The first device, identified as a foreign TxS, is the place where the end-user initiates the transaction. The second device, identified as the home TxS, holds the business information for the pre-paid account. The home TxS is requested by the foreign TxS to retrieve the PIN information and update the account.

WO9944165 relates to e-Commerce on the Internet and never discusses the mobile domain or the implications of roaming within this domain. The solution is restricted to prepaid transactions.

A major weakness with this system is the low security level offered, due to the exchange of PIN data. This assumes a trust level between the home TxS and the foreign TxS. It is assumed that a user will automatically trust the foreign TxS, and provide secret information, such as a PIN, to this foreign server. In the mobile world it is very likely that the home operator and the foreign operator have no trust relationship. This makes this solution less feasible in a mobile communication network.

Further, WO9944165 mentions nothing on how to identify the home server, it is assumed that the foreign server knows this server.

THE INVENTION

BRIEF DESCRIPTION

The present invention is aiming at removing the limitations mentioned above by introducing roaming capability in the Mobile e-Commerce systems.

The substance of Mobile e-Commerce lies on the mobility of the user. It should be possible for a mobile user to access Mobile e-Commerce services whenever and wherever he/she is, both nationally and internationally.

Currently, when roaming, the mobile user can communicate with their Home Mobile e-Commerce Service Area. They can still make a bet, pay a bill or perform a transaction. How- ever, when it comes to purchasing it is likely that he/she wants to buy things that are local at the visiting site.

For example internationally, then it is quite obvious that they will want to purchase movie tickets at a visited cinema, and not their home theatre. It is likely that this cinema or visited ticket provider will not have an established agreement with the Home Mobile e-Commerce Service Provider.

On the other hand, the visited ticket provider probably has the necessary agreements with the Visiting Mobile e-Commerce Service Provider but cannot offer services to the roaming mobile user since the service provider does not have necessary subscription details such as: For security purposes: Cryptographic Keys, Digital Certificates etc. These can be used for identifying the subscriber, generating and/or verifying Digital Signatures For payment purposes: Credit Card details, Bank Account numbers etc. These can be used for completing payment transactions. The situation is depicted in FIG. 3. The current solution does not allow a mobile user away from home to access both the Home Mobile e-Commerce service and Visiting Mobile e-Commerce services. This is a major limitation of present systems.

According to the invention, if an MeC server is approached by an unknown user, it will find the users home MeC server and redirect him to that server. The home MeC server will then take care of the security verification and payment processes. Afterwards, the user is redirected to the visited MeC server to complete the transaction. By this arrangement, sensitive information is communicated directly between the user and his home MeC server, and not revealed to foreign parties. The invention comprises:

A roaming capability module for Mobile e-Commerce Servers. The roaming module can be implemented as a plug-in to existing e-Commerce servers, and is thereby independent of the e-Commerce server.
  A method for home server location i.e. to find the Home Mobile e-Commerce server of a user.
  An interconnection protocol to complete payment and security transactions.

The scope of the present invention is as defined in the appended patent claims.

An embodiment of the present invention will now be described in reference to the appended drawings, in which.

Figure 5:
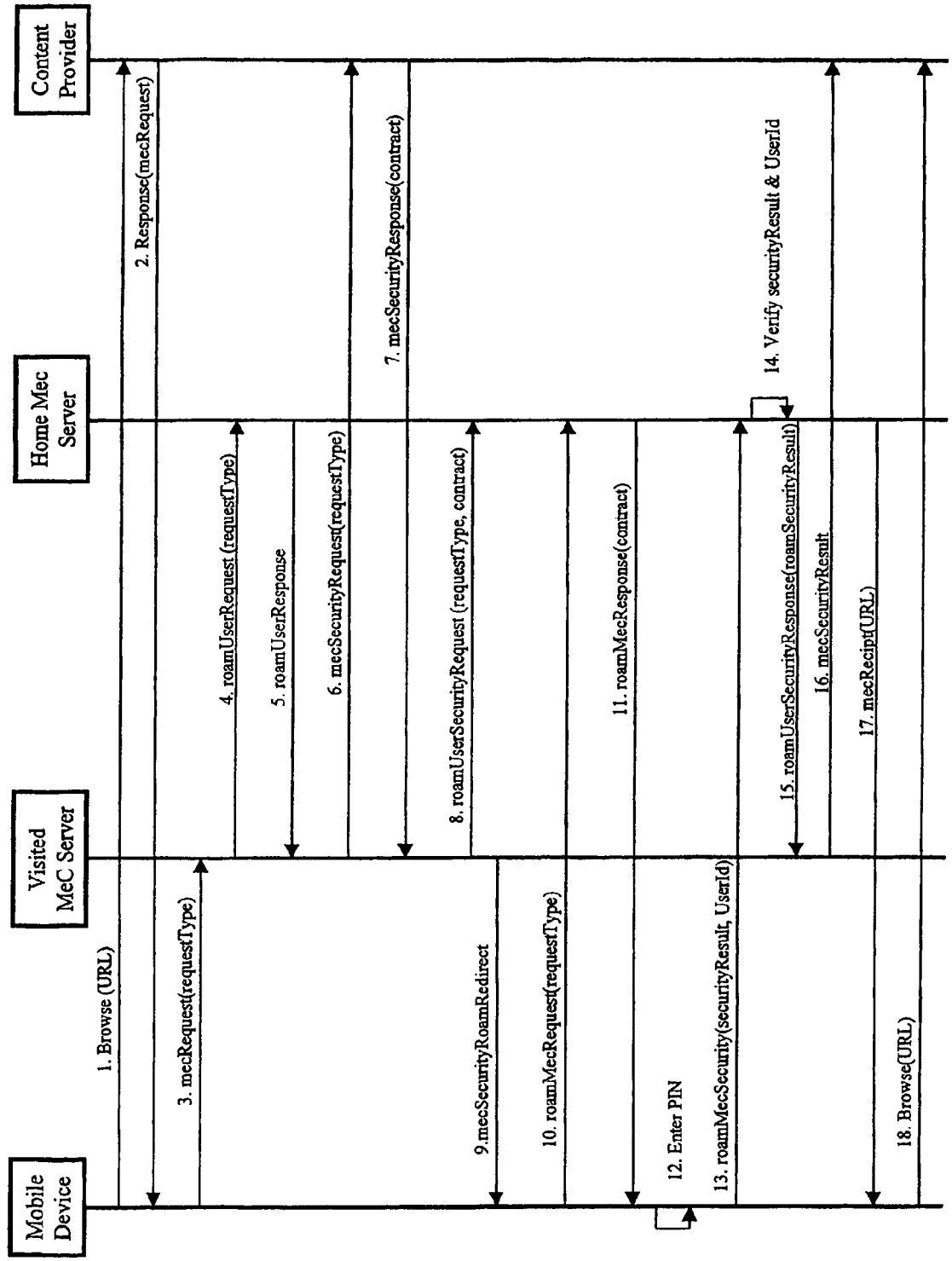

FIG. 5 relates to the interconnection protocol used for security and payment requests between the foreign and home server in a system according to the present invention, and shows the general flow diagram for such a request.

FIG. 6 is a flow diagram showing the payment flow in a roaming situation.

DETAILED DESCRIPTION OF THE INDIVIDUAL COMPONENTS IN A SYSTEM ACCORDING TO THE INVENTION

Roaming Capability Module

The roaming capability module is a module on the Mobile e-Commerce server that maintains details for other Mobile e-Commerce servers. This can be partner servers, i.e. servers of which the operators have established a mutual agreement. However, such a partnership is not mandatory, but will be assumed in the following discussion. In the module, the following details are stored:

Name: An identifier for the partner service provider.

Access Address: This is a server address that can be addressed from another server. This may be an IP address, hostname and/or a URL.

Country: This identifies in which country the remote Mobile e-Commerce server is located.

Country Code: This is the international country code prefix of the remote server subscribers, e.g. the international prefix for Norway is 47.

Local Prefix: This is a list of prefixes that the remote server accepts request for. The local prefix helps in reducing the search if many MeC servers exist within a single country.

The roaming capability module is connected to an international network, such as the Internet (or for large corporations, an Intranet). In this way it can make requests to remote Mobile e-Commerce servers.

Home Server Location

When an e-Commerce server is requested to fulfil a transaction for an unknown subscriber, it can try to identify the Home MeC server of that subscriber. The Roaming Capability Module can make a roamUserRequest to each of the partner Mobile e-Commerce servers. Using an intelligent search to reduce the partner list may reduce the number of roamUserRequest messages sent. Various methods can be used to reduce the search area, for example the subscribers phone number may identify a geographical area that should be requested first, this can be further reduced using the local prefix.

roamUserRequest

The roamUserRequest requests the remote Mobile e-Commerce server to respond indicating if they will accept requests of a specific type for the subscriber. The roamUserRequest contains at least:

A subscribers identity such as their phone number, and

The request type, such as payment, digital signature etc.

The request type relates to the purpose of the transaction, i.e. to pay for a service or goods, gain access to sensitive information (in which case it may be necessary to verify the identity of the user or establish a secure communication channel), sign an agreement (a digital certificate is needed), or start a new service.

On receipt of a roamUserRequest the remote Mobile e-Commerce server responds with a roamUserResponse. The roamUserResponse contains:

The subscriber identity

The request type

Accept or Reject

A list of additional information available to for the subscriber e.g. Payment methods available.

Figure 1:
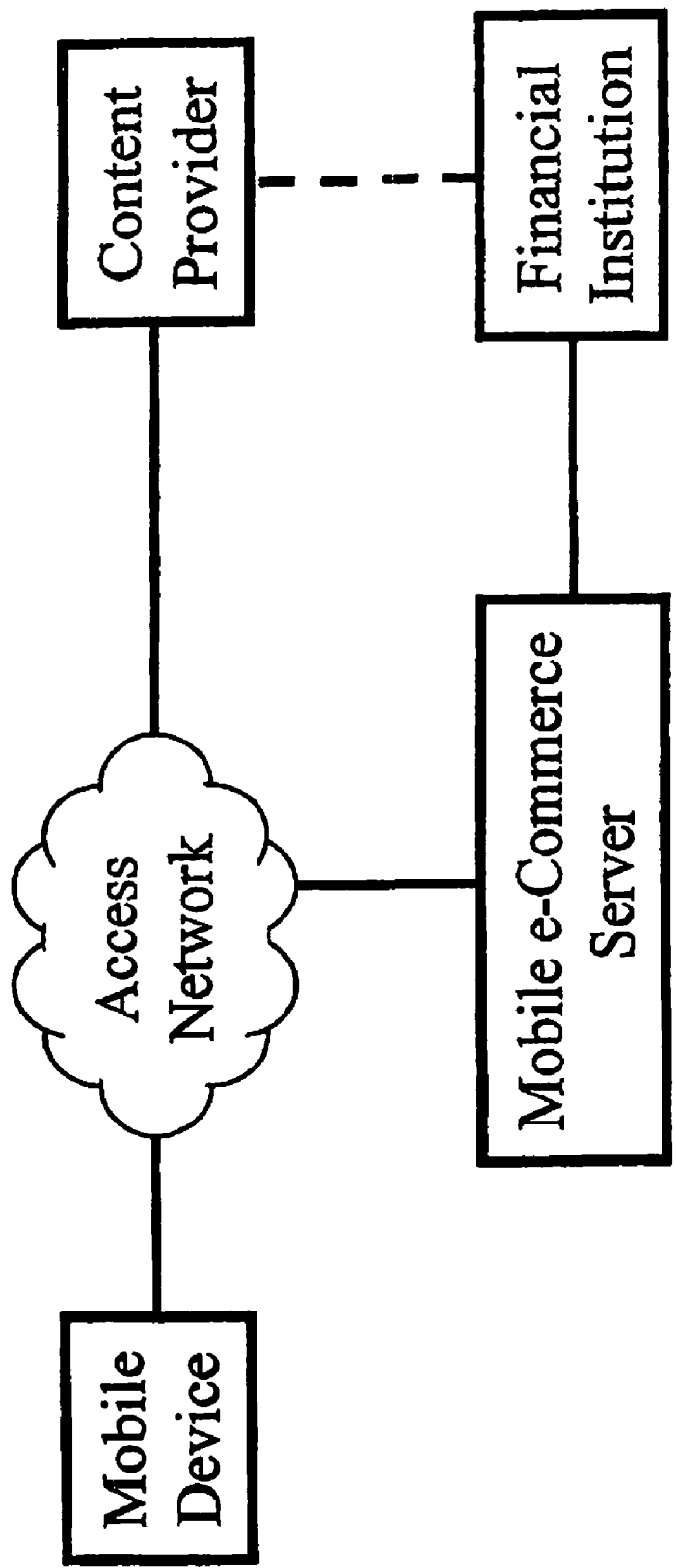
FIG. 1 shows a simplified overview of a mobile e-Commerce system (prior art)
Figure 2:
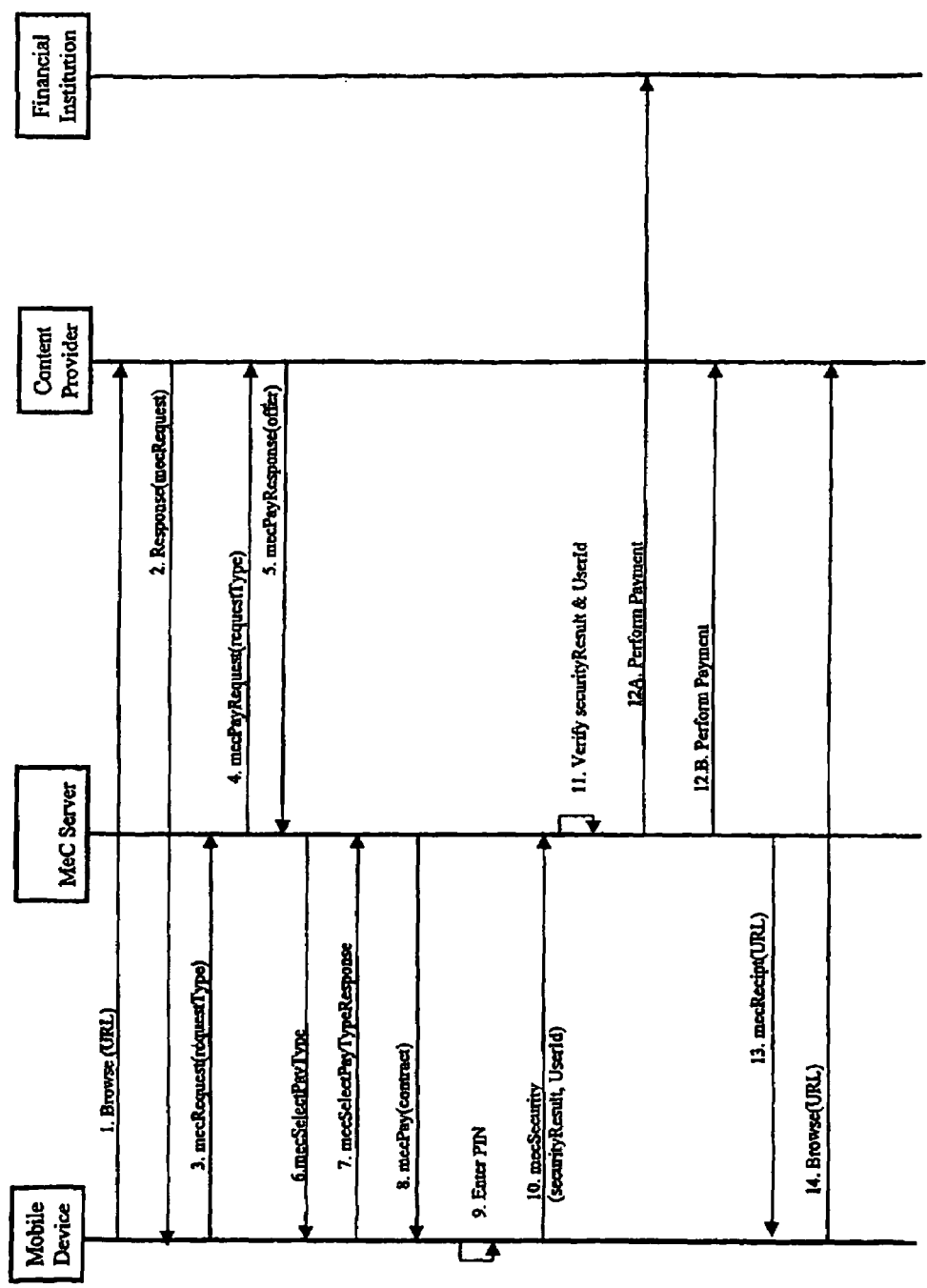
FIG. 2 shows the general payment flow in the mobile e-Commerce system depicted in FIG. 1.
Figure 3:
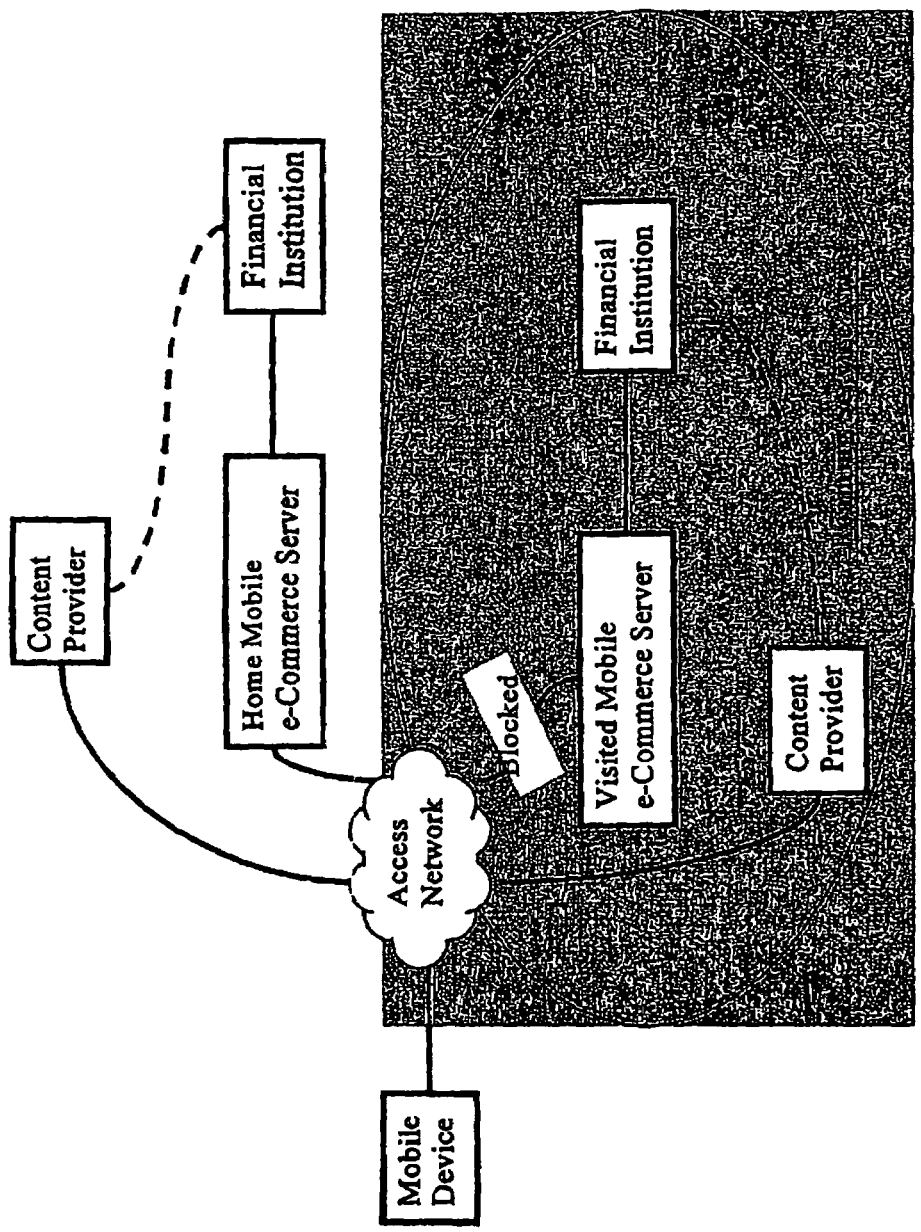
FIG. 3 shows how roaming is blocked in a system according to FIG. 1.
Figure 4:
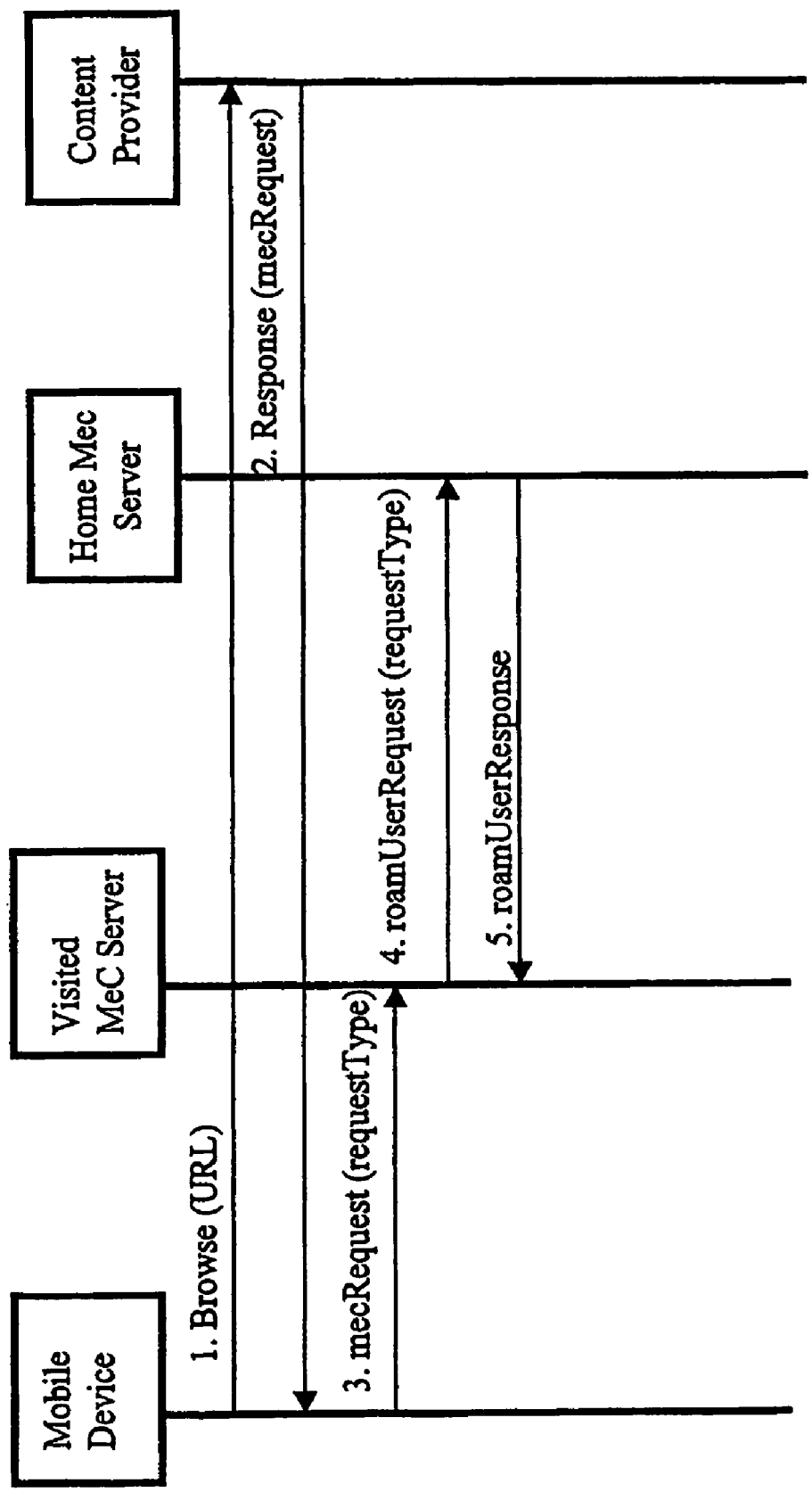
FIG. 4 is a general flow diagram of a procedure for home server location in a system according to the present invention.

FIG. 4 shows the general flow for Home Server Location.

In order to increase security the roamUserRequest and roamUserResponse may be digitally signed by the MeC server. In this way the receiving server can be more certain that the originating request is from a valid MeC server.

Once the Roaming Capability Module identifies the Home Mobile e-Commerce server then both servers can authenticate to avoid rogue systems and establish a secure communication channel. This authentication and secure communication is outside the scope of this description, but may use existing solutions such as SSL or TLS.

Interconnection Protocol

The Interconnection Protocol provides for Security and Payment Requests.

Security

One of the primary concerns with security is revealing secret information to a third party that may not be trusted. As a result it is important that all security requests are handled through the Home Mobile e-Commerce Server. To achieve this the user must be directed to their Home Mobile e-Commerce Server, and the result must be made available to the Visited Mobile e-Commerce Server.

This procedure varies somewhat in dependence of the request type, i.e. if the desired action is a payment or some other service. This service maybe requesting a digital signature to access sensitive information, such as a bank account balance, or subscribing to a new service, which requires signing of a service agreement. We will first describe the procedure followed when the request type is of some other type than payment.

FIG. 5 shows the general flow for such a request.

Following the diagram:

Steps 1-5 identify the Home Server, as described in the preceding chapter.

Steps 6-7 get a contract that will be used for Authentication or Digital Signing from the content provider Step 8 delivers the contract to the Home Mobile e-Commerce Server. This communication uses the secure link established in Steps 1-5

Step 9 is a message to direct the user to their Home Mobile e-Commerce Server

Step 10. The user makes the security request directly to their Home MeC Server. Client-Server authentication maybe used here to provide a guarantee to the end-user that they are communicating with the correct MeC Server. How this is achieved is outside the scope of this description.

Step 11. The Home MeC Server responds with the contract

Step 12. The user enters their PIN

Step 13. The security result (securityResult) is returned to the Home MeC Server Step 14. The home MeC server verifies the security result Step 15. The Visited MeC server is notified of the result Step 16. The Content Provider is notified of the result Step 17. The end user is provided with a transaction receipt, and an URL to continue browsing (18).

It is important to note that the securityResult may vary depending on the request type and the Mobile Device capabilities:

Authentication

If the requestType is authentication, then the roamSecurityResult will indicate whether or not the request was successful.

Delegated Digital Signing

If the requestType is Digital Signature, then the Home MeC is Server, may authenticate the user, and then using stored information generate the digital signature on the server.

End to End Digital Signing If the requestType is Digital Signature, or End-to-End Digital Signature and the Mobile Device supports digital signature generation, then the securityResult will be the Digital Signature generated from the Mobile Device. The roamSecurityResult may be the same signature or contain additional information. E.g. converted from PKCS#1 to PKCS#7 using locally stored information.

Payment

The following example shows the individual steps involved when the request type is payment.

FIG. 6 shows the Payment Flow when roaming. Again following the diagram:

Steps 1-5 identify the Home Server, as described in the preceding chapter.

Steps 6-7 get details of the payment from the content provider, e.g. total value of the goods/service to be purchased.

Steps 8-9. The roamUserResponse contains the payment types available for the end-user. Using this information, and local information on the Content Provider, it is possible for the Visited MeC Server, to identify a subset of available payment types, and present these to the end-user for selection.

Step 10. The Visited MeC Server generates a contract for payment and delivers it to the Home MeC Server. This communication uses the secure link established in Steps 1-5.

Step 11. A message to direct the user to their Home MeC Server.

Step 12. The user makes a pay request directly to their Home MeC Server. Client-Server authentication maybe used here to provide a guarantee to the end-user that they are communicating with the correct MeC Server. How this is achieved is outside the scope of this description.

Step 13. The Home MeC Server responds with the contract

Step 14. The user enters their PIN

Step 15. The security result is returned to the Home MeC Server

Step 16. The home MeC server verifies the security result

Step 17. The Home MeC Server delivers the result to the Visited MeC Server. This result indicates if payment can continue. It also contains relevant information to complete the payment, e.g. the end-user credit card details.

Steps 18-19. A message is delivered to verify the payment will be completed, and direct the end-user to the Visited MeC Server.

Steps 20A and 20B. The Payment is performed. This requires communication with both the Content Provider and the Financial Institution. This is outside the scope of this description as there are many well know payment solutions and flows.

Step 21. The Home MeC Server is notified of the payment result.

Step 22. The end user is provided with a transaction receipt and an URL to continue browsing (18).

Advantages

The advantages to this solution include:
1. Security relevant information such as PIN numbers or private keys is never revealed.
2. Once a content provider has established connection to a Mobile e-Commerce Server, there is no additional work for the content provider to receive payments from roaming subscribers.
3. There is no additional complexity for the end user. For example in the payment flow, Steps 12, 19 are slightly different. However, using for example the WAP, WML element 'onenterforward', the end-user may not notice the difference.

Broadening

It is possible that this could be broadened for a Server based Mobile Wallet. In this case the Home MeC server may contain the mobile wallet. Then in Steps 20A and 20B the payment flow would resolve the transfer of funds from the Mobile Wallet to the Content Provider account.

The invention claimed is:

1. A Method for performing an e-Commerce transaction via a mobile telephone network enabling the user of a visiting Mobile Station (MS) to procure services or goods from a local Content Provider (CP), the method comprising:

routing a request from the mobile station to procure a service or goods from the content provider to a visited Mobile e-Commerce (MeC) server handling the security and payment processes;

the visited mobile e-commerce server identifying the home mobile e-commerce server of the mobile station;

the visited mobile e-commerce server directing the mobile station to its home mobile e-commerce server;

the home mobile e-commerce server security verifying the mobile station and determining payment details;

passing the result of the security verification and payment details to the visited mobile e-commerce server indicating the transaction can continue;

the visited mobile e-commerce server contacting a Financial Institution (FI) to get payment clearance;

the content provider delivering the service or goods and financial institution sends the payment clearance, and the financial institution charging the user.

2. A method for performing an e-Commerce transaction via a mobile telephone network, enabling a user of a visiting Mobile Station (MS) to obtain services from a local Content Provider (CP) at a visiting site, comprising the steps of:

routing a request from the mobile station, to obtain a service from the content provider, to a visited Mobile e-Commerce (MeC) server handling the security process;

the visited mobile e-commerce server identifying the home mobile e-commerce server of the mobile station;

the visited mobile e-commerce server directing the request to the mobile station home mobile e-commerce server;

the home mobile e-commerce server security verifying the mobile station, and returning a security related product to the visited mobile e-commerce server; and the home mobile e-commerce server directing the mobile station to the visited mobile e-commerce server to complete the transaction.

3. A method as claimed in claim 2, wherein the security related product is an authentication result, a digital signature or a digital certificate.

4. A method as claimed in claim 2, wherein the security verification step includes:
   receiving a contract from the local content provider and delivering the contract to the home mobile e-commerce server;
   directing the mobile station to the home mobile e-commerce server, wherein the home mobile e-commerce server responds with the contract;
   sending the user's Personal Identification Number (PIN) to the home mobile e-commerce server to accept the contract; and,
   the home mobile e-commerce server verifying the PIN and transmitting the result of the verification to the visited mobile e-commerce server.

5. A method as claimed in claim 2, wherein the security verification step further comprises:
   receiving a contract from the local content provider and delivering the contract it to the home mobile e-commerce server;
   the home mobile e-commerce server responding with a contract, when the mobile station is directed to the home mobile e-commerce server;
   the mobile station accepting the contract by returning a first digital signature generated in the mobile station; and
   the home mobile e-commerce server verifying the first digital signature, packaging said first digital signature into a second standard digital signature, and transmitting the second digital signature to the visited mobile e-commerce server.

6. A method as claimed in claim 2, wherein the step of identifying the home mobile e-commerce server further comprises:
   the visited mobile e-commerce server consulting a table of available mobile e-commerce servers and subsequently issuing a request (roamUserRequest) to each mobile e-commerce server, wherein the request includes the following fields:
   subscriber identity and
   request type, such as payment or other service, whereupon each requested mobile e-commerce server responds with a message (roamUserResponse) including the following fields:
   subscriber identity;
   request type;
   accept or reject;
   additional information available for the subscriber; and
   continuing to consult the table and sending the roamUserRequest until one of the contacted mobile e-commerce servers issue a positive response, or the list of available servers is exhausted.

7. A method as claimed in claim 6, wherein the table of available mobile e-commerce servers includes the fields:
   name of the mobile e-commerce server;
   access address of the mobile e-commerce server;
   country, in which the mobile e-commerce server is located;
   country code and local prefix of the mobile e-commerce server; and
   the visited mobile e-commerce server performing a logical search in the table to narrow down the number of possible mobile e-commerce servers.

8. A method as claimed in claim 6, wherein the table of available mobile e-commerce servers only comprises servers that have established a partnership with the visited mobile e-commerce server.

9. A method as claimed in claim 6, wherein the requests and the responses are digitally signed by the mobile e-commerce servers.

10. A method as claimed in claim 6, wherein identifying the home mobile e-commerce , causes both servers to authenticate.

11. A Method as claimed in claim 10 wherein client-server authentication is used in the communication between the mobile station and the home mobile e-commerce server.

12. A system for performing an e-Commerce transaction via a mobile telephone network, enabling a user of a visiting mobile station (MS) to obtain services from a local Content Provider (CP) at a visiting site, the system comprising:
   means for routing a request from the mobile station, to obtain a service, from the content provider to a visited mobile e-commerce (MeC) server handling the security process;
   the visited mobile e-commerce server having means for identifying the home mobile e-commerce server of the mobile station;
   directing the request to the mobile station home mobile e-commerce server;
   security verifying the mobile station, and
   returning a security related product to the visited mobile e-commerce server; and
   the home mobile e-commerce server having means for directing the mobile station to the visited mobile e-commerce server to complete the transaction.

13. The system of claim 12, wherein the means for returning a security related product is an authentication result, a digital signature or a digital certificate.

14. The system of claim 12, wherein the means for security verification includes:
   means for receiving a contract from the local content provider and delivering the contract to the home mobile e-commerce server;
   means for directing the mobile station to the home mobile e-commerce server, wherein the home mobile e-commerce server responds with the contract;
   means for sending the user's Personal Identification Number (PIN) to the home mobile e-commerce server to accept the contract; and,
   the home mobile e-commerce server having means for verifying the PIN and transmitting the result of the verification to the visited mobile e-commerce server.

15. The system of claim 12, wherein the means for security verification further comprises:
   means for receiving a contract from the local content provider and delivering the contract it to the home mobile e-commerce server;
   the home mobile e-commerce server having means for responding with a contract, when the mobile station is directed to the home mobile e-commerce server;
   the mobile station having means for accepting the contract by returning a first digital signature generated in the mobile station; and
   the home mobile e-commerce server having means for verifying the first digital signature, packaging said first digital signature into a second standard digital signature, and transmitting the second digital signature to the visited mobile e-commerce server.

16. The system of claim 12, wherein the means for identifying the home mobile e-commerce server further comprises:
   the visited mobile e-commerce server having means for consulting a table of available mobile e-commerce servers and subsequently issuing a request (roamUserRequest) to each mobile e-commerce server, wherein the request includes the following fields:
   subscriber identity and request type, such as payment or other service, whereupon each requested mobile e-commerce server responds with a message (roamUserResponse) including the following fields:

subscriber identity;

request type;

accept or reject;

additional information available for the subscriber; and the visited mobile e-commerce server having means for continuing to consult the table and sending the roamUserRequest until one of the contacted mobile e-commerce servers issue a positive response, or the list of available servers is exhausted.

17. The system of claim 16, wherein the table of available mobile e-commerce servers includes the fields:

name of the mobile e-commerce server;

access address of the mobile e-commerce server;

country, in which the mobile e-commerce server is located;

country code and local prefix of the mobile e-commerce server; and the visited mobile e-commerce server performing a logical search in the table to narrow down the number of possible mobile e-commerce servers.

18. The system of claim 16, wherein the table of available mobile e-commerce servers only comprises servers that have established a partnership with the visited mobile e-commerce server.

19. The system of claim 16, wherein the requests and the responses are digitally signed by the mobile e-commerce servers.

20. The system of claim 16, wherein the means for identifying the home mobile e-commerce, causes both servers to authenticate.

21. The system of claim 20 wherein client-server authentication is used in the communication between the mobile station and the home mobile e-commerce server.

* * * * *